July 22, 1969     W. LAIKAM, JR     3,456,561

AIR PRESSURE ACTUATED CYLINDER UNIT

Filed Sept. 25, 1967

INVENTOR.

William Laikam Jr.

BY

Webster & Webster

ATTYS.

United States Patent Office 3,456,561
Patented July 22, 1969

3,456,561
AIR PRESSURE ACTUATED CYLINDER UNIT
William Laikam, Jr., 8938 S. McCall Ave.,
Selma, Calif. 93662
Filed Sept. 25, 1967, Ser. No. 670,040
Int. Cl. F15b 11/15
U.S. Cl. 91—440    4 Claims

ABSTRACT OF THE DISCLOSURE

An air pressure actuated cylinder unit for the controlled intermittent operation of a tool; the cylinder having a piston, and the unit including an air control valve and passage means arranged so that air under pressure in the cylinder—behind the piston after a tool-actuating operation and after the control valve has been closed—will be automatically fed into the cylinder ahead of the piston, and will then vent to atmosphere from the forward end of the cylinder.

BACKGROUND OF THE INVENTION

The cylinder unit, which is the subject of this invention, is of the type particularly adapted to operate hand-supported tools such as pruning shears supported on the cylinder and used to prune grapevines, orchard trees, and the like. Such a cylinder conventionally has a port in its head or forward end to outwardly vent the air in the cylinder ahead of the piston as the latter thrusts forward to operate the tool. However, when the piston is thereafter retracted by the normally included spring, it induces a suction which results in a sharp inflow of air through the port and into the cylinder. Heretofore, this inflow drew dust and other foreign matter into the cylinder with ultimate abrasion and damage. In this connection, the outward venting of the air from the port at the forward end of the cylinder often occurred when the unit was adjacent and directed toward the ground, resulting in the dust being stirred up and moved into the atmosphere adjacent the operator manipulating the tool. Then, when the following inflow of air into the cylinder occurred, the air borne dust was objectionably drawn into the cylinder.

SUMMARY OF THE INVENTION

The present invention provides, as a major object, a cylinder unit—for the purpose described—constructed so that the air from behind the piston (heretofore exhausted from the cylinder at its rear end when the piston was retracted by the spring) is instead diverted into the cylinder ahead of the piston and then exhausts through the port in the head or forward end of said cylinder. By reason of this feature, not only does the pressure of the air so diverted aid the spring in retracting the piston, but also—and more important—such diverted air, by exhausting through said forward end port, prevents the previously objectional suctional inflow of air into the cylinder so that dust has no tendency to, and in fact cannot, enter the cylinder through said port.

The present invention provides, as a further object, an air pressure actuated cylinder unit which is designed for ease and economy of manufacture, convenience of use, and long life, with a minimum of maintenance or repair being required.

The present invention provides, as a still further object, a practical, reliable, and durable air pressure actuated cylinder unit and one which is exceedingly effective for the purpose for which it is designed.

DESCRIPTION OF THE PREFERRED EMBODIMENT

Figure 1:
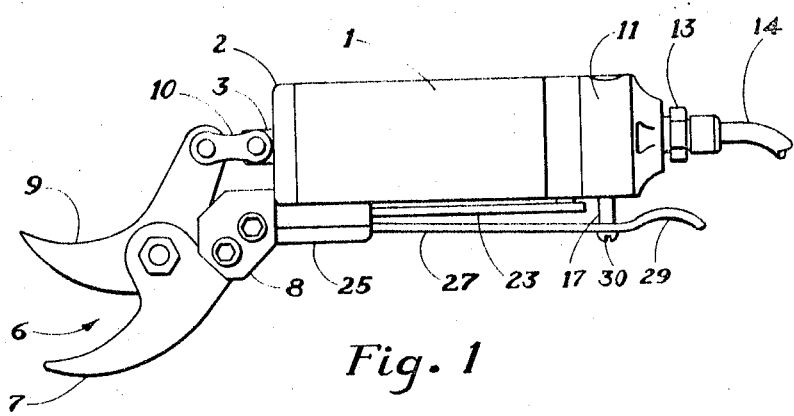
FIG. 1 is a side elevation of the improved air pressure actuated cylinder unit in a pruning shear adaptation; the view showing the shears open as when the piston is retracted.

Referring now more particularly to the drawings and to the characters of reference marked thereon, the unit comprises a cylinder 1 having a forward-end head 2 through which the piston rod 3 is slidable. Within the cylinder the piston rod is connected to a piston 4; a heavy-duty compression spring 5 about the piston rod between the piston 4 and the head 2 yieldably but forcefully normally maintaining the piston in a retracted position.

A tool, operated by reciprocating movement of the piston rod, is mounted on the forward end of the cylinder 1 in connection with the piston rod 3; the tool being here shown as pruning shears indicated generally at 6. The shears 6 comprise a stationary blade 7 fixed on an ear 8 projecting from the head 2 below the piston rod 3, and a movable blade 9 pivoted intermediate its ends on the blade 7; the movable blade 9 being connected at its rear end to the forward end of the piston rod by a pivotal link unit 10.

A circular block unit 11 closes and projects from the rear end of the cylinder 1, and while such block unit may actually be made in several individual, initially separate parts for convenience of manufacture, and as shown, it is considered—in this description—as being a single member. At its rear end, the block unit 11 is formed with a socket 12 having a suitable fitting 13 threaded therein, and by means of which fitting a small but heavy-duty, flexible tube or hose 14, adapted for connection to a source of air under high pressure, is connected to the block unit.

Formed in the block unit 11, intermediate its ends, is a diametrally extending valve cylinder 15 in which a piston-type control valve 16 is slidable; such control valve including an axial end stem 17 projecting downwardly from said block unit. A suitably mounted spring 18 acts on the control valve 16 to yieldably maintain the same in a retracted position, and at which time the stem 17 projects as far as possible from the block unit 11.

An air feed passage 19 leads from the socket 12 to one side of the valve cylinder 15, while another passage 20 leads from the opposite side of said valve cylinder to the adjacent end of the cylinder 1; the passage 20 being in offset relation to the passage 19 lengthwise of such valve cylinder. The control valve 16 is formed in a manner so that when in a retracted position, communication between the passages 19 and 20 is shut off.

Figure 2:
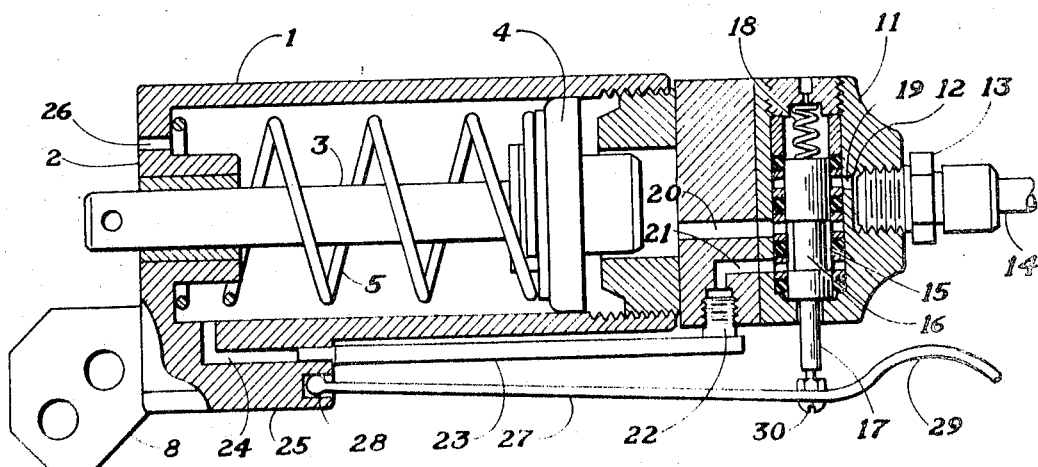
FIG. 2 is a sectional elevation of the unit with the control valve in the position thereof when the piston is spring-retracted; the shears removed from said unit.

A third passage 21 leads from the valve cylinder 15 to the bottom of the block 11 from a point between the passage 20 and said bottom. The passages 20 and 21 are disposed relative to each other, and the control valve 16 is formed in a manner, so that when said valve is in a retracted position, communication is established between said passages 20 and 21, as shown in FIG. 2.

A fitting 22 is threaded in the passage 21 at its outer end; such fitting 22 supporting a rigid longitudinal tube 23 opening through such fitting to the passage 21. The tube 23 extends along the bottom of the cylinder 1 on the outside thereof, and at its forward end such tube matchingly engages in the rear end of a passage 24 formed in a boss 25 on the bottom of the cylinder 1 at its forward end. The passage 24 opens into the cylinder 1 adjacent but short of the head 2; the latter having a vent port 26 therethrough at a point preferably some distance from the passage 24.

The control valve 16 is advanced, so as to place the passages 19 and 20 in communication with each other, by means of a finger-actuated lever 27. This lever extends from a swivel mounting within the boss 25 at its rear end, as at 28, rearwardly and past the stem 17 to a finger-engaging trigger 29; the lever having a swivel connection, as at 30, with the outer end of the stem 17.

Figure 3:
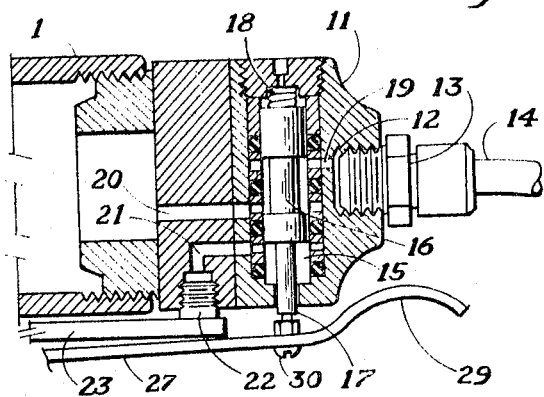
FIG. 3 is a fragmentary sectional elevation of the unit, showing the control valve in the position thereof to advance the piston.

With the foregoing arrangement of parts, it will be seen that with the cylinder 1 held in one hand of an operator, and with a finger of said hand engaging the trigger 29, the control valve 16 may be advanced by suitable finger pressure on said trigger and the lever 27 as a whole, with resultant movement of such lever and stem 17. Such advance of the control valve 16 will establish communication between the passages 19 and 20, and shut off communication between the passages 20 and 21, as shown in FIG. 3. Air under pressure is thus admitted to the rear of the cylinder 1, advancing the piston 4 and piston rod 3, resulting in the blade 7 being moved through a cutting stroke. When the piston 4 is so advanced, the air in the forward portion of the cylinder 1 exhausts through vent port 26.

When the valve-advancing finger pressure on the lever 27 is released, the control valve 16 will, of course, return to its retracted or closed position, shutting off the air feed to the cylinder 1, and placing passages 20 and 21 in communication. When this occurs, the air under pressure—trapped in the cylinder between the piston 4 and the block unit 11—is instantaneously released and delivers through such communicating passages 20 and 21, through tube 23 and passage 24, and thence feeds into the cylinder ahead of the piston. This produces desirable results in the following respects:

Firstly, as the air under pressure feeds into the cylinder ahead of the piston, such air then exhausts to atmosphere from the vent port 26, and this outflow of air through such port precludes the creation of any suctional inflow of air (and entrained dust) into the cylinder upon the retraction of the piston and which occurs under the influence of spring 5 when the control valve is returned to its closed position as aforesaid.

Thus, during both the advancing stroke, and the retracting stroke of the piston, there is a positive outflow of air through the vent port 26 and under no operational circumstance can dust be drawn into the cylinder through such port. This is the primary advantage of the present invention.

Secondly, and also of advantage, the air under pressure as fed into the cylinder ahead of the piston immediately after its advancing stroke, materially aids the spring 5 in retracting such piston. This speeds up the retracting stroke of the piston and opening of the shears 6 for the next cutting operation thereof.

From the foregoing description, it will be readily seen that there has been produced such an air pressure actuated cylinder unit as substantially fulfills the objects of the invention, as set forth herein.

I claim:

1. In an air pressure actuated cylinder unit which includes a cylinder closed at both ends and having a piston reciprocable therein, separate passages opening into the cylinder beyond opposite ends of the piston in any position thereof, valve means operable to open or close one passage relative to a source of compressed air, said valve means being arranged to automatically establish communication between said one passage and the other passage upon said one passage being closed by such valve means relative to said source of compressed air, and the cylinder having an open to atmosphere vent port therein beyond the piston in any position thereof and in the same direction as the point of opening of said other passage into said cylinder.

2. In a hand-supported air pressure actuated tool including a cylinder of a size to be conveniently held in the hand, the cylinder having front and rear end closure members, a piston slidable in the cylinder, a piston rod attached to the piston and projecting through the front end closure member, a work device exteriorly on said front end closure member and to which device the piston rod is operatively connected, the cylinder having an air vent port therein ahead of the fully advanced position of the piston, a spring in the cylinder tending to retract the piston, a compressed air conduit connected to the rear end closure member, hand-controlled valve means in said rear end closure member to control the feeding of compressed air from the conduit into the rear end of the cylinder to advance the piston against the resistance of the spring, and means included in part with said valve means to automatically cause the compressed air trapped in the cylinder between the piston and rear end closure member to discharge directly into the cylinder ahead of said fully advanced position of the piston upon shutting off of the feeding of compressed air into the rear end of the cylinder and retraction of the piston by the spring; the compressed air as so discharged into the cylinder outflowing through said vent port to preclude any suction inflow therethrough and as otherwise attendant retraction of the piston.

3. An air pressure actuated tool, as in claim 2, in which said last named means includes a passage leading from the valve means directly into the closed-end cylinder ahead of said fully advanced position of the piston; said valve means, when in a position to shut off feeding of compressed air into the rear end of the cylinder, then establishing communication between said rear end of the cylinder and such passage.

4. An air pressure actuated tool, as in claim 3, in which the vent port is formed in and extends through the front end closure member; and in which said passage leads into the cylinder at a point relatively remote from said vent port.

References Cited

UNITED STATES PATENTS

| | | | |
|---|---|---|---|
| 356,999 | 2/1887 | Hale | 91—440 |
| 696,635 | 4/1902 | Harvey | 91—440 |
| 2,640,368 | 6/1953 | Schjolin | 92—130 X |
| 3,274,903 | 9/1964 | Fischer et al. | 92—130 X |

CARROLL B. DORITY, JR., Primary Examiner